(12) United States Patent
Chatterjee et al.

(10) Patent No.: US 6,826,582 B1
(45) Date of Patent: Nov. 30, 2004

(54) METHOD AND SYSTEM FOR USING FILE SYSTEMS FOR CONTENT MANAGEMENT

(75) Inventors: Sanjoy Chatterjee, Raleigh, NC (US); George Ericsson, Shrewsbury, MA (US); Roy Clark, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 350 days.

(21) Appl. No.: 09/969,295

(22) Filed: Sep. 28, 2001

(51) Int. Cl.[7] .............................................. G06F 17/30
(52) U.S. Cl. ....................... 707/205; 707/10; 707/102; 707/104.1; 709/223; 711/209
(58) Field of Search ...................... 707/10, 102, 104.1, 707/205, 310, 203; 709/223, 209, 213; 711/209

(56) References Cited

U.S. PATENT DOCUMENTS

| | | | | |
|---|---|---|---|---|
| 5,832,522 A | * | 11/1998 | Blickenstaff et al. | 707/204 |
| 5,873,103 A | * | 2/1999 | Trede et al. | 707/204 |
| 5,940,840 A | * | 8/1999 | Eshel et al. | 707/205 |
| 6,249,792 B1 | * | 6/2001 | Zwilling et al. | 707/205 |
| 6,321,219 B1 | * | 11/2001 | Gainer et al. | 707/3 |
| 6,381,742 B2 | * | 4/2002 | Forbes et al. | 717/176 |

* cited by examiner

*Primary Examiner*—Alford Kindred
*Assistant Examiner*—Leslie Wong
(74) *Attorney, Agent, or Firm*—A. Jose Cortina; Daniels Daniels & Verdonik, P.A.

(57) ABSTRACT

A file system and method serves to create and manage content. The file system includes at least one directory having at least one file containing data, but about which at least one file has no information. A repository of metadata provides information about the data in the files. Phantom files are created which are designated by names and associated attributes, point to data in base files, without specifying a path name to the base files.

21 Claims, 11 Drawing Sheets

Repository

| Content Name | Resides in | Phantom? | Parent Content | Parent Resides in | Size (bytes) | Starts At | Class | Time |
|---|---|---|---|---|---|---|---|---|
| F11 | File 7 | No | | | | | | |
| F12 | File 7 | No | | | | | | |
| F13 | File 7 | No | | | 300 | 0 byte | | |
| F14 | File 5 | No | | | | | | |
| F15 | Phantom File 10 | Yes | F14 | File 5 | 999 | 0 byte | | |
| F16 | Phantom File 10 | Yes | F12 | File 7 | 200 | 1000 byte | | |

Figure 6

Repository

| Content Name | Resides in | Phantom? | Parent Content | Parent Resides in | Size (bytes) | Starts At | Class | Time | Method |
|---|---|---|---|---|---|---|---|---|---|
| F11 | File 7 | No | | | | | audio | recent | |
| F12 | File 7 | No | | | | | Image | recent | |
| F13 | File 7 | No | | | 300 | 0 byte | video | | |
| F14 | File 5 | No | | | | | | | |
| F15 | Phantom File 10 | Yes | F14 | File 5 | 999 | 0 byte | campus-map | old | |
| F16 | Phantom File 10 | Yes | F12 | File 7 | 200 | 1000 byte | campus-map | recent | |
| F17 | PF17 | Yes | F14 | File 5 | 300 | 0 byte | | | M1 |

Figure 7

Repository

| Content Name | Resides in | Phantom? | Parent Content | Parent Resides in | Size (bytes) | Starts At |
|---|---|---|---|---|---|---|
| C11 | File C | Yes | C1 | File A | | 0 byte |
| C12 | File D | Yes | C1 | File A | | 51 byte |
| C1 | File A | No | | | 300 | 0 byte |

Figure 8

METHOD AND SYSTEM FOR USING FILE SYSTEMS FOR CONTENT MANAGEMENT

BACKGROUND OF THE INVENTION

1. Field of the Invention

The invention relates to a file system as used in computers for storing and using different types of data such as text, audio, video, spreadsheets, presentations, and images wherein the data has identifiable parts.

2. Description of the Background

In the past, file systems implemented on computers and computer networks have been part of the operating system running on the computer. Thus, in the case of an operating system such as Windows NT, which is available from Microsoft Corporation, AIX, UNIX, etc., there is a file system that comes as part of the operating system.

In the past, in implementing such file systems through the operating system, it was assumed that everything is connected. Thus, when a request was made from a file system, a user created a file, and that file was directly passed to storage. At this point the operating system owns all the phases of the request, and as long as it is maintained within the computer running the operating system, everything functions smoothly.

However, while functioning smoothly in a stand-alone system, management of the file system can become complicated in more modern arrangements typically known as network attached storage systems (NAS). In an NAS environment, the file system component has been removed from the operating system and placed on storage units which include "intelligence" in the form of a storage processor which may be a CPU, and one or more non-volatile memory components such as a disk drive.

In such an NAS environment, what occurs is that a user creates a file or performs any kind of file system operation and sends the file or the file system operation over the network to an external facility. How that is controlled becomes a complex issue. More specifically, a request has been sent, and you know a reply to the request will be forthcoming, but how it is processed is no longer under the user's control. More specifically, the file handling utility in the operating system no longer comes into play, because the file has been released to another environment, and the file system component on the storage unit.

In the past, the management of such a file system was not particularly complex because most of the data was either text or business operational data such as payroll. Increasingly, users have been storing different kinds of data, such as multi-media data, etc. As a result, tools have been developed to identify parts of such data which has meaning and usage in itself.

One example is that users of the extensible markup language (XML) mark up their data into useful segments such as "address of the sender," "price quotes," etc. Using XML tools the data can now be placed into files where size and boundaries of the segments are known to the file system. It is a common practice in applications which create and distribute content to read files to search for identifiable segments of data, or content, and to mix them in different ways to distribute to end users. It is also a common practice to alter the data according to user profile. A still further and more recent practice has been to deploy a data source directly connected to a network in an NAS environment.

There are a number of problems with current file systems in the content management environment. Initially, knowledge of where the content boundaries and sizes are in a file must be resident in an application. Any mixing of the content must be accomplished by writing an application or duplicating the data in a different form. As will be appreciated by those of ordinary skill in the art, duplication of data causes problems because any updates to the data must be made to different places, introducing the possibility of user error. Changes to the content must be accomplished through the use of an application, and constraints or new security definitions and new attribute definitions to the content can only be accomplished through an application. Finally, there is no mechanism to transmit how the users desire the content to be modified. This process creates complications because each user in a chain must transmit the entire data to a prior user until it returns to the initial user. The initial user then makes the modifications and sends out data to the recipient. As a result, this significantly increases the amount of data flowing through the network.

One attempted solution to resolve the problem is through the use of XML to try to capture the semantics of business data operations to help reduce the cost of developing content applications. Numerous products add attribute-based search capabilities and limited forms of modifications. Some allow a framework for defining some forms of content modification. Each provides a limited solution to the problem.

The related tools do not solve the problem of having to write a custom application for solving every problem. Similarly, no capability for creating new content from existing data with its own property and security definitions is provided. The specific steps for different types of modification definitions to be transmitted are not addressed. In accordance with the invention, the problems of the current solutions are avoided by virtualizing the file system interface so that desired content can be created without having to write an application.

SUMMARY OF THE INVENTION

In accordance with one aspect of the invention, there is provided a file system for creating and managing content. The file system contains directories containing base files which contain data about which information is not known. A repository of metadata contains identifying information about the data in the base files. Phantom files may exist based on at least one base file. The phantom files are designated by names and associated attributes. The phantom files contain information about data in base files but do not specify a path name to the base file containing the data. The phantom files may point to segments of data in base files and properties of the data without requiring duplication of the data into additional files.

More specifically, the phantom files identify the properties of the segments of data identified, and include attributes of the segments, as well as user restrictions limiting access to the segments of data to specified users.

In another aspect, there is described a method of managing content in an existing file system. The file system has a plurality of directories having base files containing data about which information is not known. A repository of metadata containing identifying information about the data in the base files is created. Phantom files are created and designated with names and associated attributes. The phantom files contain information about data in base files but do not specify a path name to the base file containing the data. Segments of data which are named as content in the base file are thus identified by the phantom file, with the segments of data being defined for use by users accessing the phantom file.

The phantom files may be created by splitting an existing file along content boundaries, combining contents of an existing file into a phantom file, splitting or combining contents of phantom files, defining a filter to work on content, mirroring an existing file, or versioning an existing file.

Thus, in accordance with the system and method described herein, the file system interface is virtualized where desired content can be created without writing an application, but instead, by creating a phantom file. This allows users to create myriad views of data effortlessly without resorting to creating applications. It provides additional adaptation definitions which abstract the notion of data modifications, and provides a generalized model of modifying content and transmitting the request for modification.

BRIEF DESCRIPTION OF THE DRAWINGS

Having thus briefly described the invention, the same will become better understood from the following detailed discussion, taken with reference to the appended drawings, wherein:

FIGS. 6, 7 and 8 are tables illustrating the file system's content repository.

DETAILED DESCRIPTION

Figure 1:
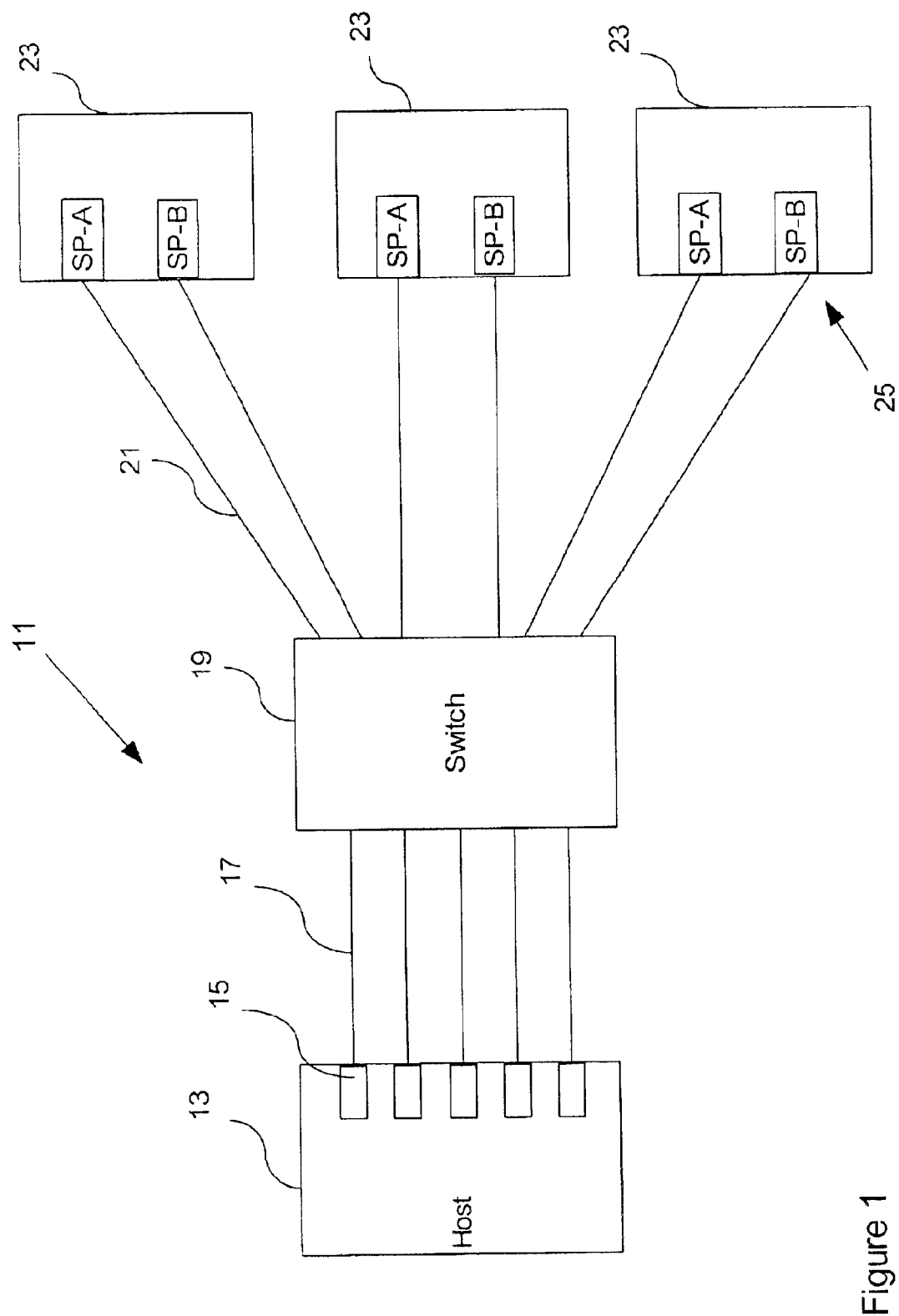
FIG. 1 is a block diagram illustrating one version of the network attached storage system upon which the system and method described herein may be implemented.

FIG. 1 illustrates in block diagram form one network 11 which is a network attached storage system configuration on which the method and system described herein can be implemented. A host server 13, which can be a server such as is available from Sun Microsystems or other vendors, is connected through adapters 15 through fibre channel connection 17 to a switch 19 which in turn connects through fibre channel connections 21 to a plurality of storage units 23. The storage units are of the type which have on-board intelligence, for example, in the form of storage processors 25 designated in the figure as SP-A and SP-B. This type of storage unit is readily available from a number of sources, most notably EMC² Corporation, and are well known to those of ordinary skill in the art. The storage units 23 also include a number of other components therein, including a plurality of disks making up a disk array for storing and processing data operated on the network 11.

Figure 2:
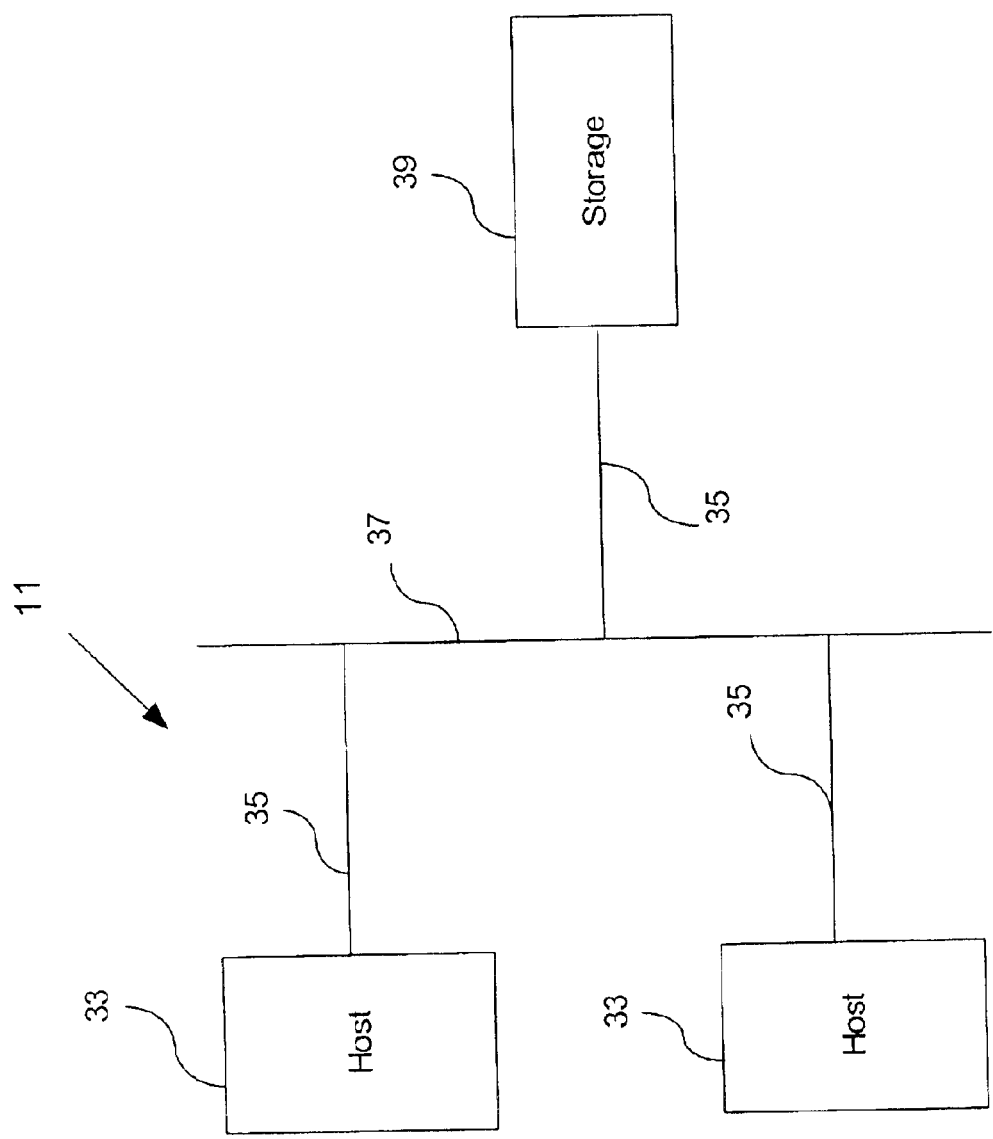
FIG. 2 is an alternative embodiment shown in block diagram form of a different type of network attached storage system upon which the method and system described herein can be implemented.

FIG. 2 shows an alternative configuration of a network arrangement implementing the NAS system. In this case, plural host 33 can be connected through connections 35 to a network implemented, for example with an Ethernet bus 37, which in turn also has connected thereto through connection 35 a storage unit 39, which also has on-board intelligence, and which serves to process data storage and handling requests from the respective hosts 33.

Figure 3:
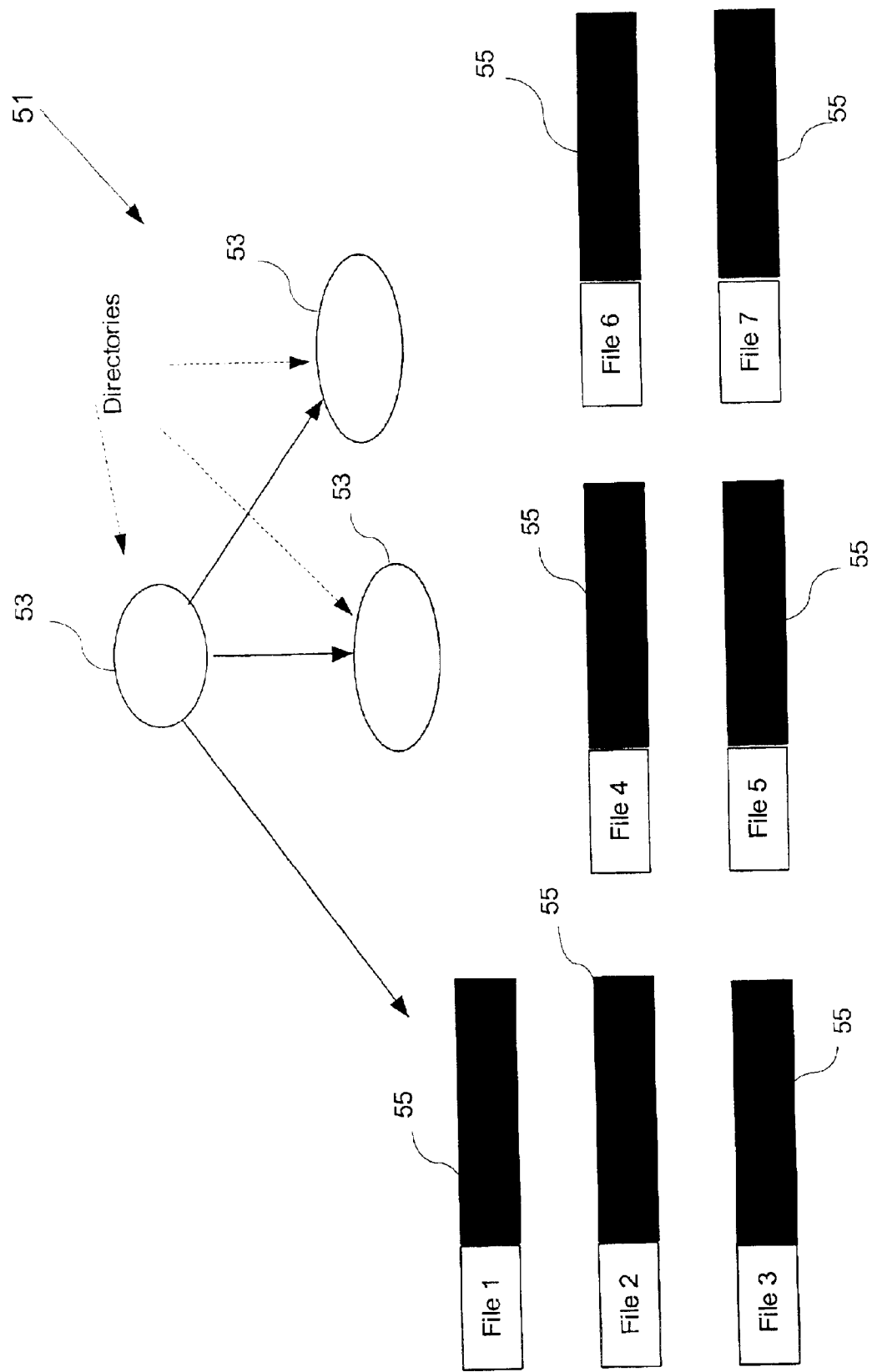
FIG. 3 is a schematic diagram illustrating current file system implementations.

FIG. 3 illustrates the typical file system of the type implemented as part of an operating system running on a computer. The file system 51 includes directories 53 and under the directories 53 there are named files 55 which contain user data. For example, with respect to File 1, "File 1" is the name of the first file and the black portion represents user data about which the file system does not contain any information.

Figure 4:
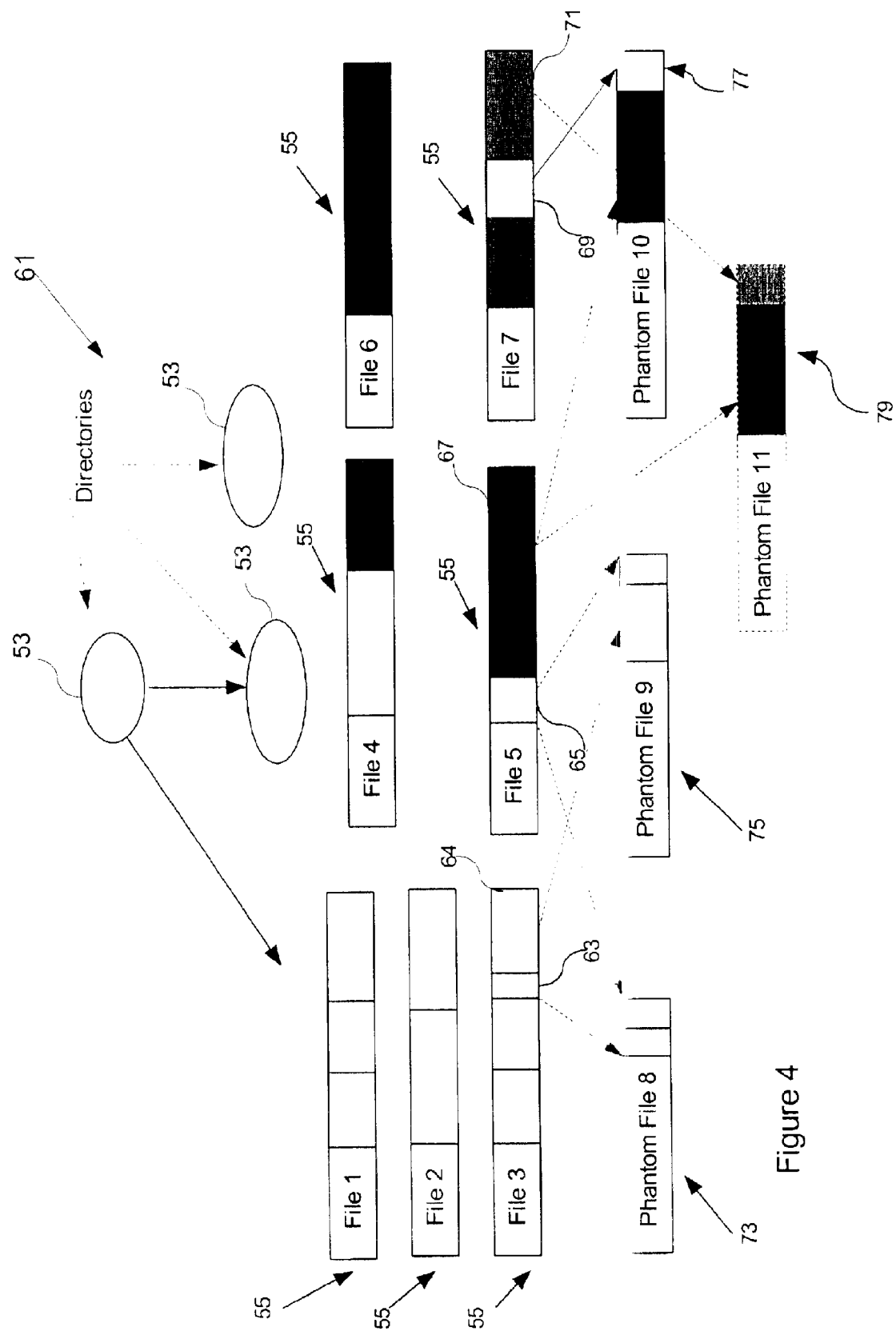
FIG. 4 is a schematic diagram illustrating how the file system, in accordance with the method and system described here, is implemented.

FIG. 4 illustrates in schematic form the logical view of the file system and method described herein.

As in the case with FIG. 3, file system 61 includes directories 53 under which are found files 55 which include portions of data about which information is not known. Under the file system 61, phantom files 73–79 are created, and the user can describe the properties and attributes of data which is seeded into the phantom files 73–79.

For example, using the file system 61, the user can inform the file system that File 1 points to the location in storage of three segments of data therein and can name those segments. In addition, the user can describe the properties and attributes of the segments of data as described hereafter. The choice of describing the contents of data identified inside of a file is optional. In FIG. 4, the user describes the contents of the data associated with all files except File 6, and may create phantom files 73–79 as follows. By phantom files is meant files containing collections of content segments in the form of pointers to segments within other files or phantom files. For example, in the case of phantom file 8, designated 73, there is no user data identified therein as evidenced by the shading. Instead, phantom file 8 is created by defining that the segment 63 from File 3 and segment 65 from File 5 make up phantom file 8. Segments of data are collections of data, which as a group has meaning to one or more users. For example, a segment may be identified by type, such as an image, allowed access to, such as limited to a specified user group, etc.

Phantom file 9 designated by the number 75 is created by defining that the last segment 64 of File 3, followed by the first segment 65 from File 5.

Phantom file 10 is created by defining that the dark segment 67 from File 5 is resident first, followed by the second segment 69 from File 7.

Phantom file 11, designated by the number 79, also does not contain user data and in fact does not yet exist. It is defined as a file which will have two segments of data, first the dark section 67 from File 5, and the segment 71 from File 7. The segment 71 from File 7 is defined to have a user defined attribute called "severity." By the term "severity" is meant some user defined threshold which if exceeded causes a file segment to be instantiated within a phantom file. The user defined File 11 will be created when the "severity" attribute in File 7 exceeds a value of 80.

Figure 5:
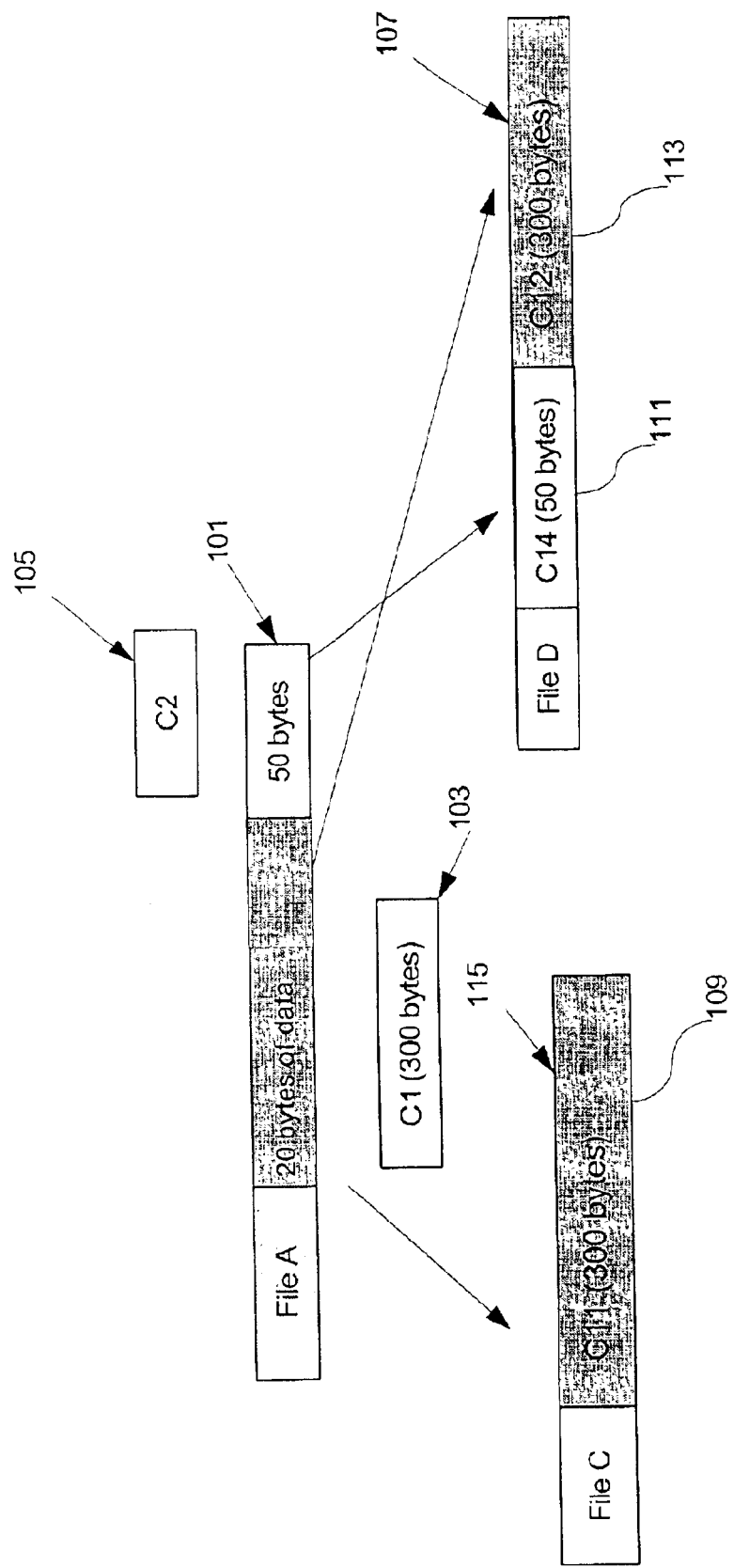
FIG. 5 is a schematic diagram illustrating a set of file descriptions.

FIG. 5 illustrates in schematic form and in greater detail a set of file descriptions. In this case, File A, 101 includes two contents sections C1, 103 and C2, 105. The first content section 103 identifies content which is 300 bytes long, and the second content section 105 identifies content which is 50 bytes long. These values are set forth for purposes of illustration only. Two phantom files 107 and 115 are defined as Files C and D. File C is created and contains only content C11 designated by the number 109 which is a redefinition of content 103, i.e., C1 which is 300 bytes long. File D has only contents C14 and C12 designated by the numbers 111 and 113. Content C14 is a redefinition of C2 followed by content C12 which is a redefinition of C1.

FIGS. 6 and 7 illustrate a part of the file system's repository implemented in the system and method described herein. By the term "file system content repository" is meant metadata (data about data), e.g., size, severity, location, etc., which is stored. The repository resides on disk, separate from data. A repository is well known to those of ordinary skill in the art. More specifically, in this case, the file systems content repository (FCR) is a table which describes all the user defined content segments, which files they reside within, which phantom files point to them, and other attribute information particular to content. The FCR is stored as file system metadata in a similar fashion to how the file system directory structure information is stored. The table illustrated in FIG. 6 could have other columns depending upon implementation. As the user defines the segments in File 7, entries are made for the three segments F11, F12 and F13 in terms of their name, which file they reside in, their sizes, their starting positions, and if they are phantom contents or not. A similar entry is made for segment F14. As phantom file 10 is defined, two entries are entered for its segments, F15 and F16. It is important to appreciate that F15 is a file content which refers to content F14 in File 5, and F16 is a phantom file content which refers to content F12 in File 7.

FIG. 7 illustrates in table form how additional attributes can be defined for content in the repository. For example, a user may define content F11 to be an audio file, content name F13 to be a video file content, and content file F12 to be an image file content. In addition, content files F15 and F16 which are derived from content files F14 and F12 respectively, can be given a different class attribute called, for example, "campus-map" which is a subclass of an image which is a map of a campus. The use of a campus map herein is merely to illustrate how the system and method are implemented and other items like "airplane layout," "topography," etc. can also be identified in this manner. The creator of File 5 and File 7 may have decided not to clarify the content any more than that it is an image. However, an application which may want to display campus-maps may want to further clarify without disturbing the original data and definition. In addition, the "time" attribute is defined by the user to indicate that File F15 is an older version and File F16 is a newer version. The next entry in the repository may be a content file F17, which is a phantom file content residing in File PF17, i.e., a phantom file, and is derived by using content file F14 and filtering it through a specific method M1. By a specific method is meant a specific user defined application, for example, a JAVA applet, as will be readily apparent to those of ordinary skill in the art. More particularly, a specific method is an algorithm describing when and how a data transformation should take place.]

FIG. 8 illustrates how repository entries are made for FIG. 6, and specifically referencing FIG. 5. Note that in the phantom files, size attributes of C11 and C12 are not specified, but since they are the contents of phantom files, their sizes can be derived from the size of the parent file.

Thus, the method and system described herein is an operational concept and specification and does not require a specific implementation scheme. The method and system involve the notion of named pieces of data about which attributes can be specified, and which reside within a file. In the system, users request a file to be created by a name and associated attributes without specifying the path name to the file. The user may choose to place it in a folder, which as is well known to those of ordinary skill in the art, is a named collection of files.

For illustrative purposes, the attributes of a file could be Class, Type, Subtype, and Size, and Name. With respect to Class, this refers to user-defined entities which can be defined through an administrative interface for the system which is created. Type refers to an enumeration denoting if the file is an image, an audio, a video, text, spreadsheet, presentation, or mixed document. Subtype denotes whether the file has a specific extension, such as, .doc, .xls, etc. Size refers to the initial size, if any, desired for the file. Name refers to the name of the file, not the pathname, and can be proper names, actions, or topics.

After a file is created, users can put content in the file. It will be appreciated that by file can be meant a traditional file and/or a phantom file. For purposes of this description, by the term "content" is meant a named piece of data having the attributes of Class, Type, Size, Name, Name Qualifiers, Name-type, Date, Time, Attribute Qualification, and Offset. It will be appreciated that these terms share some duplication with the terms for the file described previously. In the case of the content and its attributes, class, as in the case with the files, refers to user-defined entities, which can defined through an administrative interface. File classes can have constraint properties such as content-type, which is a class which can be defined to have only certain types of content, and content-name-type, which is a class which can be defined to have content belonging to same names.

Type, as in the prior discussion, is an enumeration denoting if the content is an image, an audio, a video, text, spreadsheet, presentation, or a mixed document. Size is set forth in bytes, and Name is the name of the content and as before, can be proper names, actions or topics.

Name Qualifiers can include On, Off, or By. For example, if "speech" is a name (name-type being action), then "speech ON middle-east" could be the description of an audio file. The "middle-east" would be a Name Qualifier.

Name Type specifies that the name is a proper name, action or topic. Date refers not to the creation date, but the date the content was created. Time is related to the temporal dimension of content. User defined terms such as "recent" "old" etc. apply here. For example, to create a term called "recent" a user may define it as a creation date which is earlier than Jan. 1, 2001. These definitions would be created through an administrative interface which is created in a manner well known to those of ordinary skill in the art to implement the phantom file.

Attribute Qualification refers to a pair containing a qualification such as "full name," "role," etc. and the associated value. Offset is an optional argument, and users can specify where the content in the file should go using the Offset.

In addition, as noted previously, an interface is provided through which users can define contents in an existing file manually. The system will check for inconsistencies such as overlap of starting offsets or content. When a user defines a content in a file, the system stores all the attributes of the content along with location of the content in a repository.

Later users can create phantom files by one of the following methods:
  splitting a existing file long content boundaries. For example, if the file contains content A, B, C and D, users can create two phantom files VF1 and VF2 where VF1 contains A and B and VF2 contains C and D;
  combining contents of an existing file into a phantom file;

splitting or combining contents of phantom files;

defining a filter to work on a content;

mirroring an existing file; or versioning an existing file, for example, a second update version of a base document.

In implementing the system, phantom files have only entries in a repository and may not contain data. When any content is included in a phantom file, it can be included as filtered. A filter is a predefined executable piece of code, as will be apparent to those of ordinary skill in the art, which can be invoked to transform content to another form. The file system consists of a repository to contain data about the definitions of the files and their contents. In operation, when a user defines the contents of a file, for example File 7 has three segments named F11, F12 and F13 as illustrated in FIG. 3, it makes an entry into its internal metadata store to that effect as shown in FIG. 5. When the users add attributes to these names, the system updates the metadata entries to capture the attribute as illustrated in FIG. 6.

The important points of the file system is that users create new files out of existing data by simply using predefined names which represent parts of the existing data and describing the structure of the new files instead of using programs to create the data. Thus, new files become rearrangements of existing files and can even be defined as conditional rearrangements.

Figure 9:
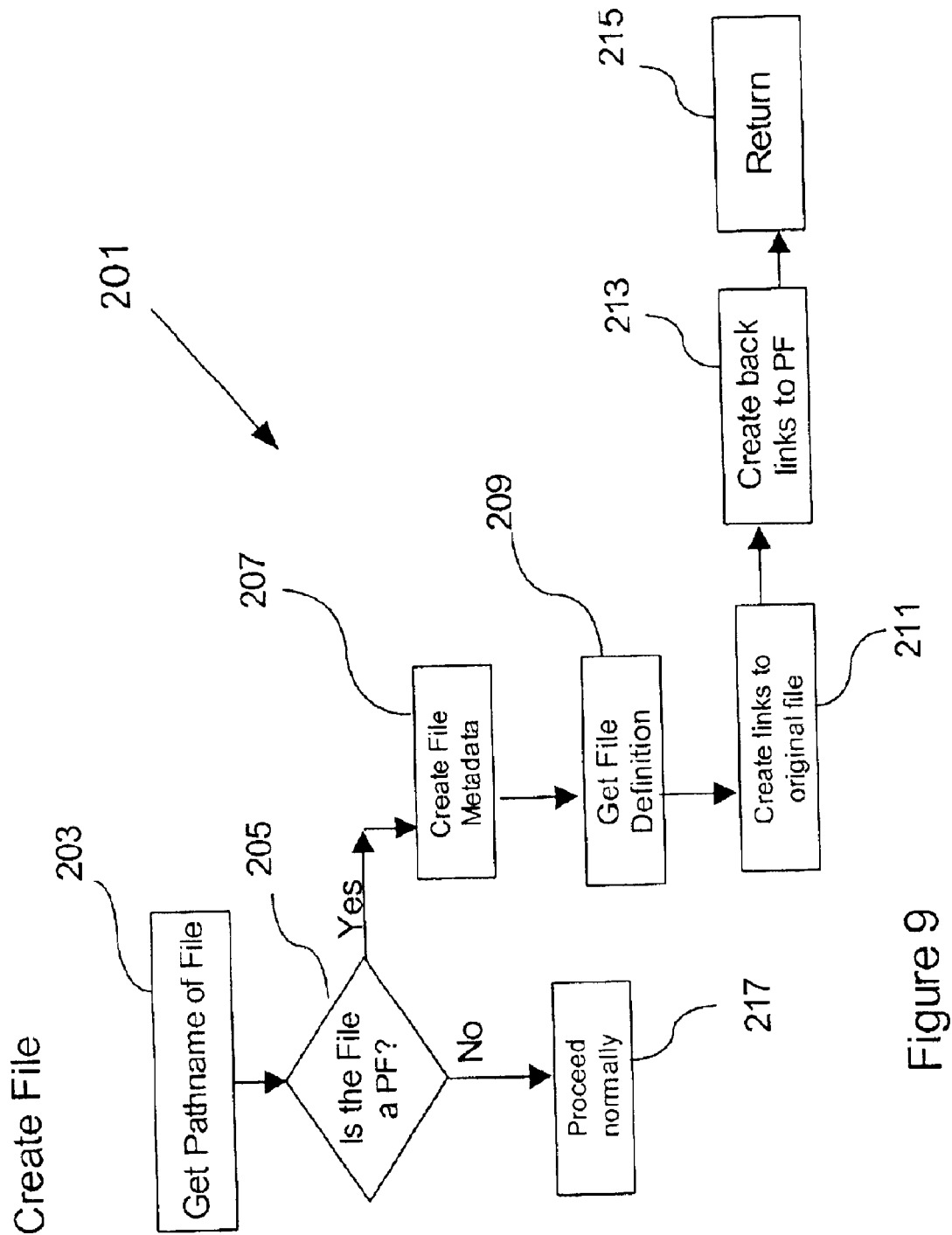
FIG. 9 is a block diagram illustrating how creation of files is implemented.
Figure 10:
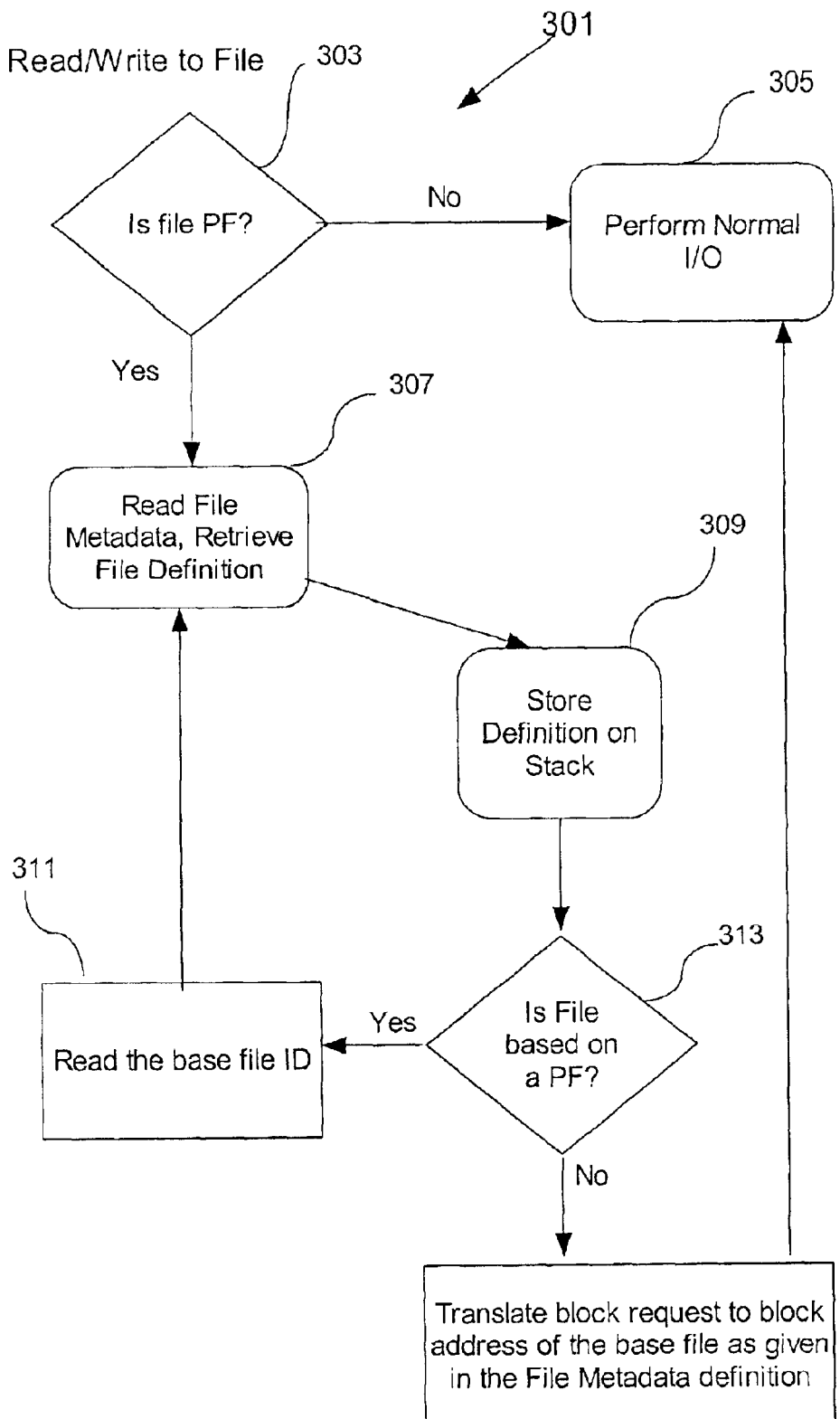
FIG. 10 illustrates in block diagram form how reading and writing operations to a file are conducted.
Figure 11:
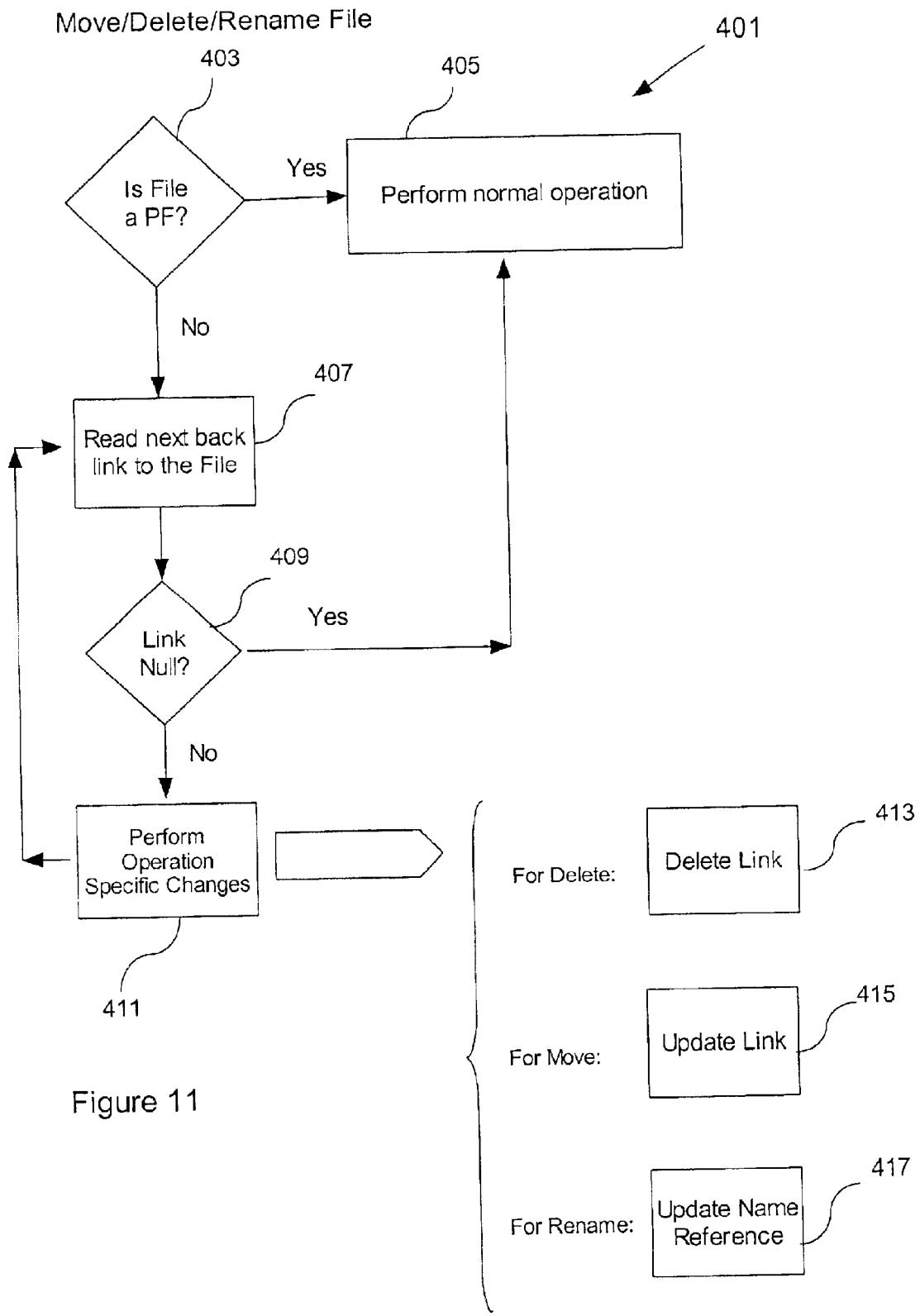
FIG. 11 illustrates in block diagram form how files can be moved, deleted, or renamed.

As will be appreciated, software can be implemented as referenced from the flow diagrams of FIGS. 9–11 in a conventional manner well known to those of ordinary skill in the art once the invention is known, to create and access new files based on their definitions. If the mode of definition follows the standard protocol described previously, the system replaces the need for a user to write software to create and access the files.

Since the data is not duplicated and the original data resides on the files, and new files are accessed by searching for the true data content at the time of access, "normalcy" is maintained, resulting in higher productivity and fewer errors. Thus, users can create different views of the same data, for example, F15 as shown in FIGS. 6 and 7, by redefining it in a different file, i.e., phantom file 10, and redefining the content as an "old campus-map" without writing any new software.

Referring now to FIG. 5, if a user requests the first 20 bytes of C11, the system looks up the repository searching for C11, realizes that C11 is a phantom content where the real parent is C1 in File A. The system would then look up C1 and find that C1 starts at byte 0 in File A, read the first 20 bytes of File A and return them to the user.

Alternatively, if the user requests the first 20 bytes of File C, the system searches on "resides in" column to find that contents C11 is the first content in File C, and the user request is satisfied by obtaining the first 20 bytes of File C. The system then repeats the previous step and obtains the data.

If the user requests byte 51 through byte 70 of File D, the system searches the "resides in" column to find the contents of File D. For each of these contents, it will use the "starts at" column to find out that content C12 starts at byte 51 in File D. It will then search content-name column in the repository and discover that C12 is the phantom version of C1 which resides in File A starting at byte 0. Thus the system has discovered that byte 51 through byte 70 of File D is really the first 20 bytes of File A, which it will then access.

In both of these examples, different users can obtain the first 20 bytes of File A by:

(1) reading the first 20 bytes of File A;

(2) reading the first 20 bytes of File C;

(3) reading byte 51 through byte 70 of File D;

(4) reading the first 20 bytes of content C11;

(5) reading the first 20 bytes of content C12; or (6) reading the first 20 bytes of content C1.

In all these cases, all the reads translate to reading the same data, i.e., the first 20 bytes of File A, which is stored only once. When a change needs to be made to the data, only one place, i.e., File A, needs to be changed, and the change is instantly reflected in all the above styles of reading the data. The repository entries are locked when they are read such that other users may not modify the data while one user is trying to determine how to access a particular piece of content. When the user obtains the data desired, all locks on the repository elements are then removed.

Concerning transmission of content change information, a protocol is defined which can be implemented in different ways. The protocol will not specify all the specific content of the communication, but only requisite parts and their properties.

Three elements are needed for the protocol. A first element is Source content which is one of the content that is known to both parties. A second element is a Method which is an implementation specific piece of software code, which can be executed by the receiving party, and is coded according to a protocol where the sending party can define the inputs which are understood by the receiving party. The methods can be implemented in a manner well known to those of ordinary skill in the art once its functionality is appreciated from a reading herein, and can be self-describing or predefined. For data values, methods can use only content or variables defined in the method. Finally, a Modifier is a third element which can be content or another method.

In implementing the system, any type of existing manner can be used like Java Applet, etc. The defined contents make it easy to define the methods without the need to write expensive software.

Thus, consider a user at a site who wants to display the "campus-maps" stored and served by another site. The user desires to display the maps with his name on it. He sets up a method M1 on the second site using the system, which takes content as shown in FIG. 7, superimposes the words "courtesy of user" at the bottom right. Next he creates a phantom file PF17, which defines content F17 as F14 with method M1 applied to it as a filter. Using his web page, the user points to serving content F17 to his customers when they request a campus map. When the user's customers, from a third site, retrieve PF17, the system searches the repository to retrieve the definition of F17, realizes that F17 is a phantom content derived by applying method M1 to F14 and retrieves F14 and superimposes the words "courtesy of user" according to the method M1 and sends the new content directly to the third site without intervention by the first site.

FIGS. 9–11 illustrate at a higher level changes implemented by the system to file operations such as create-file, read-file, write-to-file, move-file, delete-file, and rename-file. For purposes of this description, the following acronyms used in the figures mean the following.

PF: Phantom File

Blocks: a defined size of data (usually a disk)

Timestamp: a value obtained from an intelligent computing element which uniquely identifies a point in time Metadata: Data Structure defining a file. A file is a set of blocks containing data and a set of attributes such as permissions (who can perform what operation on a file), creation time, last altered time, size, owner name and where the blocks are located on stable storage. Depending upon the file system, there could be other attributes.

Links: A mechanism to identify another structure. For example, a link to a file would locate a file, be in the same system or another system. The specific implementation of links is left for individual system designs. A null link signifies no link.

Base File: A Phantom File is always defined against another file (s). These file(s) will be termed "Base File(s)".

Definition: A phantom file has a definition associated with it. The definition could be a range of bytes from the base file(s) or a query against the base file(s) using standard structure definition languages such as XML. The specific nature of the definition is left to the implementation. This invention assumes that there is a mechanism (implementation specific) to use the definition to translate a block in the phantom file to a block in a base file.

In describing FIGS. 9–11, it is important to appreciate that there is a mechanism to communicate information on file, given its link, to the system where the file exists. That communication may be a subroutine call within a system or a network call over an Ethernet connection, fibre channel, etc., to another system or any other similar mechanism.

The modification to the create file function is illustrated in FIG. 9. At step 203 a string of characters is obtained representing the pathname of a file. The pathname is extracted from a request to create the file. As step 205 it is determined if the file is a phantom file. In the system, each file will have an entry as to whether it is a phantom file or not. At this step, the system looks at the FCR and determines if it is a phantom file. If the file is not a phantom file, then at step 217 the system proceeds normally to create the file. To proceed normally implies the appropriate update of the FCR. If it is a phantom file, then at step 207 the FCRs are set up and updated to keep metadata for the file. The specific nature of the structure is immaterial so long as it captures the definition of a phantom file. At step 209, the file definition from the metadata is retrieved, and at step 211, a link is set in the metadata of the phantom file to the original file that the definition is referring to.

At step 213 a backward link is created in the original file to the phantom file and updates the metadata of the original file. The purpose of this step is to ensure that when the original file is operated on, for example, deleted, etc., the system knows which phantom file systems are affected. Thereafter, at step 215, operation is resumed, which is supported by the current file system. This is dependent upon the file system which is being enhanced for use of phantom files.

Reading and writing to file operations are modified in accordance with the flow diagram 301 illustrated in FIG. 10. At a step 303 it is determined whether the file is a phantom file. If the answer is no, the system proceeds to step 305 which is similar to step 215 of FIG. 9 and resumes operations. If the answer is yes, at step 307 the metadata structure is read, and the file definition is retrieved from it. At step 309 the definition is stored on a stack. A "stack" is a well-known structure to those of ordinary skill in the art and can be implemented in any of various standard manners. The definition is pushed at the current top of the stack and moves the stack pointer up so that the next thing can be pushed on the stack.

At step 313 it is determined if a file definition contains additional references to a phantom file. If the answer is no, at step 315, when a read-write request is made to a file, it is to read or write to a particular byte offset in a file. The offset and the range to read-write can be turned into a set of block addresses. This can be done, for example, by dividing a fixed number depending on the file system implementation. The addresses are translated into the corresponding block addresses of the real file according to the definition, and the method returns to step 305 to perform normal I/O.

If the answer at step 313 is yes, then at step 311 the file definitions are retrieved and it is determined if the definition is based on a real or a phantom file and the process returns back to step 307.

With respect to FIG. 11, a block diagram 401 illustrates how changes are made to move/delete/rename file functions. The method commences at step 403 which is the same as step 303 of FIG. 10 and step 205 of FIG. 9 and a determination is made whether the file is a phantom file. If the answer is yes, then the method proceeds to step 405 to perform normal operations similar to step 305 of FIG. 10 and step 217 of FIG. 9.

If the answer is no, then at step 407, the metadata of a file is retrieved and the backlinks read, if any, in the file metadata which was stored at step 213 of FIG. 9. At step 409 it is determined whether a link is NULL.

If the answer is yes, then the system returns to perform normal operation at step 405. If the answer is no, then at step 411 operation-specific changes are performed as enumerated for the delete, move, and rename functions by blocks 413, 415 and 417 which defines the operation-specific changes to be performed at step 411 and the system then returns back to step 407.

Having thus specifically described the invention the same will become better understood from the following appended claims in which it is described in a non-limiting manner.

What is claimed is:

1. A file system for a network attached storage arrangement, for creating and managing content, comprising:

said file system being independent of an operating system residing on a computer;

a plurality of directories having base files containing data about which information is not known;

a repository of metadata separate from data in the base files, and containing identifying information about the data in the base files; and phantom files comprising files containing collections of content segments in the form of pointers to segments within at least one of other files and phantom files, said phantom files designated by names and associated attributes without specifying a path name to the at least one of other files and phantom files, and said designations of names and associated attributes having been created by at least one user of the system.

2. The file system of claim 1, further comprising said phantom files identifying at least one segment of data in at least one base file, and information about the properties of said at least one segment of data.

3. The file system of claim 2, further comprising the phantom file having attributes of said segments of data identified.

4. The file system of claim 3, wherein said attributes comprise user restrictions limiting access to said segments of data to specified users.

5. The file system of claim 1, wherein said file system resides on at least one host on a network having storage units connected to the network, and wherein said storage units have on board intelligence to allow management of data in said phantom files.

6. The file system of claim 1, wherein at least one of said phantom files may contain no data, and is reserved for later use with data segments to be identified therein.

7. The file system of claim 1, wherein said identifying information comprises class, type, subtype, size and name.

8. The file system of claim 1, wherein data and information are named and defined with the following attributes: class; type; size; name; name qualifiers; name type; date; time; and attribute qualification.

9. The file system of claim 8, wherein said attributes further comprise offset.

10. The file system of claim 1, further comprising means for locking base files or a phantom file from users when one user is operating on the base files or the phantom file.

11. The file system of claim 1, wherein said phantom files point to segments of data from base files, with said segments of data defined for use by users addressing the phantom files.

12. A method of managing content in an existing file system in a network attached storage arrangement, said file system being independent of an operating system running on a computer, and having a plurality of directories having base files containing data about which information is not known, the method comprising:

creating a repository of metadata separate from data in the base files, and containing identifying information about the data in the base files; and creating phantom files comprising files containing collections of content segments in the form of pointers to segments within at least one base of other files and phantom files, and designating the phantom files with names and associated attributes without specifying a path name to the base files, with said designation of names and associated attributes being created by at least one user of the system.

13. The method of claim 12, wherein data from base files is identified in the phantom files, the data comprising the content are defined to have the attributes of: class; type; size; name; name qualifiers; name type; date; time; and attribute qualification.

14. The method of claim 13, wherein said attributes further comprise offset.

15. The method of claim 13 further comprising creating a user interface to allow users to define contents in existing files manually.

16. The method of claim 15, further comprising:

manually defining contents in base files through the use of said interface;

checking for inconsistencies in the content; and storing all the attributes of the existing content along with location of the content in a repository.

17. The method of claim 12, wherein said creation of phantom files is conducted by at least one of:

splitting an existing file along content boundaries;

combining contents of an existing file into a phantom file;

splitting or combining contents of phantom files;

defining a filter to work on content;

mirroring an existing file; and versioning an existing file.

18. The method of claim 12, for comprising defining the attributes of class, type, subtype, size and name for each file created.

19. The method of claim 12 further comprising locking a base file or a phantom file from users when one user is operating on the base file or phantom file.

20. The method of claim 12, wherein the phantom files point to segments of data from base files, with said segments of data defined for use by users accessing the phantom files.

21. The file system of claim 1, wherein the phantom files are created by at least one of: splitting an existing file along content boundaries; combining contents of an existing file into a phantom file; splitting or combining contents of phantom files; defining a filter to work on content; mirroring an existing file; and versioning an existing file.

* * * * *

UNITED STATES PATENT AND TRADEMARK OFFICE
CERTIFICATE OF CORRECTION

PATENT NO. : 6,826,582 B1
DATED : November 30, 2004
INVENTOR(S) : Chatterjee et al.

It is certified that error appears in the above-identified patent and that said Letters Patent is hereby corrected as shown below:

Title page,
Item [75], Inventors, changed from "George Ericsson" to -- George Ericson --

Signed and Sealed this

Twenty-second Day of February, 2005

JON W. DUDAS
*Director of the United States Patent and Trademark Office*